Feb. 11, 1930. F. M. PICKERING ET AL 1,746,738
VALVE
Filed May 22, 1929

Inventors
FORREST M. PICKERING AND
ALBERT G. FORD,
By
Attorneys

Patented Feb. 11, 1930

1,746,738

UNITED STATES PATENT OFFICE

FORREST M. PICKERING, OF ANDERSON, INDIANA, AND ALBERT G. FORD, OF AURORA, ILLINOIS, ASSIGNORS TO ECONOMY GOVERNOR COMPANY, OF ANDERSON, INDIANA, A CORPORATION OF INDIANA

VALVE

Application filed May 22, 1929. Serial No. 365,075.

Our invention is concerned with valves of the type in which a valve member, usually having a face of some yielding material such as leather, is brought into contact with an annular valve seat to effect closing of the valve. It is our object to produce such a valve in which closing will not be interfered with or prevented by particles of solid matter which become embedded in the face of the valve member.

We accomplish our object by providing means for directing fluid flow through the valve seat in such a manner that it will impinge on the working face of the valve member on an area located within the valve seat but having a diameter considerably smaller than that of the valve seat.

We have illustrated our invention in connection with a valve of a type suitable for use in a gas pressure regulator, but it will be evident that our invention is not limited to this use and it may be employed to advantage in other situations.

Figure 1:
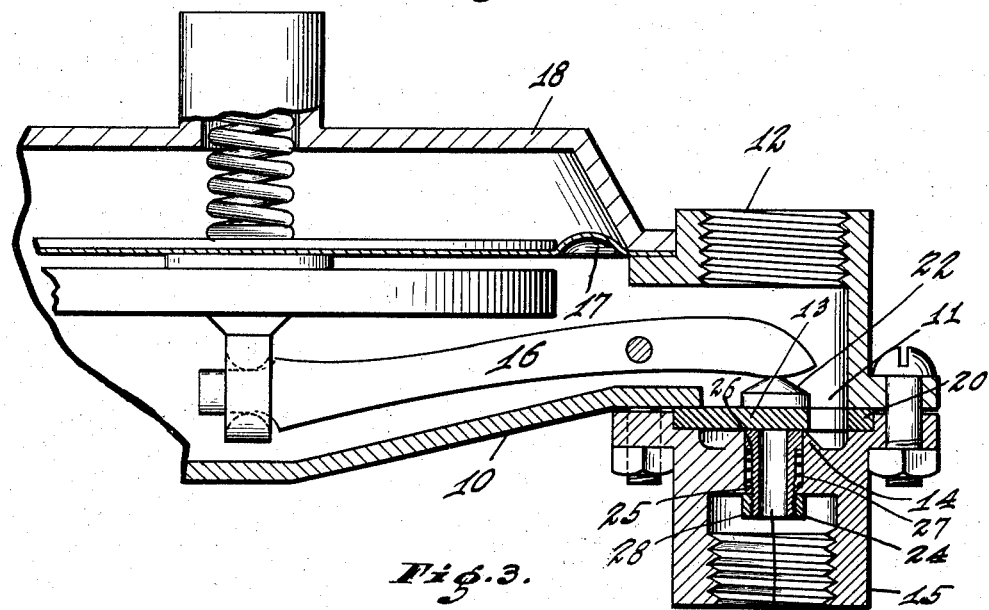
Figure 3:
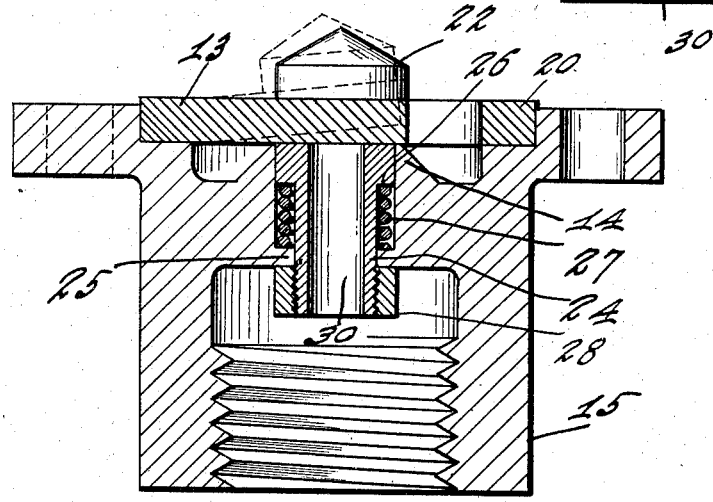
Figure 2:
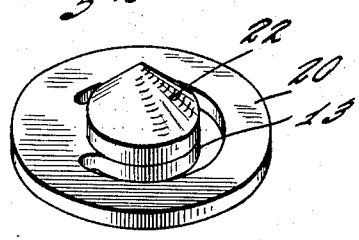

The accompanying drawing illustrates our invention: Fig. 1 is a fragmental section through a gas regulator embodying a valve constructed in accordance with our invention; Fig. 2 is a perspective view of the valve member removed from the valve; and Fig. 3 is a section similar to Fig. 1 but on a larger scale to show details of construction.

The gas pressure regulator in connection with which we have illustrated our invention comprises a hollow casing 10 having an inlet opening 11 and an outlet opening 12. The flow of gas into the casing through the inlet opening 11 is controlled by means of a valve member 13 which co-operates with an annular valve seat 14 formed in a coupling member 15 adapted to be attached to the casing by any convenient means. Operation of the valve 13 is controlled by a pivoted lever 16 which is operated in accordance with pressure changes by means of a flexible diaphragm 17 securely held in place between the casing 10 and the cover 18 therefor. The valve member 13 is conveniently formed as a part of a disk 20 of some flexible material such as leather, which disk is provided with an arcuate slot to form the movable valve member 13. Desirably, a button 22 of metal is provided on the valve member 13 to engage the lever 16.

The construction so far described is well known. Our invention is not concerned with the gas regulator but is directed to a form of valve which has advantages over other valves. In the preferred form of our invention we provide within the coupling or valve seat member 15 an axially slidable member 24. Desirably, the valve seat member is provided with a shoulder near its lower end as at 25, and the slidable member 24 has at its upper end an annular flange 26 of a diameter substantially equal to that of the bore of the valve seat member.

Disposed in the annular space between the slidable member 24 and the inner wall of the valve seat member and acting between the shoulder 25 and the flange 26, we provide a coil compression spring 27 tending to move the slidable member upwardly in the valve seat member. To limit upward movement of the slidable member 24 under the influence of the spring 27, we attach to the lower end of the slidable member below the shoulder 25 an abutment, preferably in the form of a collar 28 screw-threadedly mounted on the lower end of the slidable member. This collar limits upward movement of the slidable member to a position in which its upper face is substantially flush with the edge of the valve seat.

The slidable member 24 has a longitudinal fluid passage 30 having a diameter considerably less than the internal diameter of the valve seat member. As a result, any solid particles carried upward through the passage 30 strike the lower surface of the valve member 13 and become attached to or are embedded in such valve member near the center thereof and at a considerable distance inward from the edge of the valve seat. As a result, attachment of solid particles to the valve member is confined to an area considerably smaller in diameter than the valve seat and such particles cannot engage the edge of the valve seat and prevent complete closing of the valve. It is possible for such embedded or attached particles to extend over an area greater than the cross sectional area of the passage 30; but any such particles, when the valve is closed, engage the upper surface of the guide 24 which is free to move downward, thus avoiding interference with complete closure of the valve. It is to be noted that the fluid discharged from the passage 30 first strikes the lower face of the valve member 13 and then spreads outward. As a result of this, the direction of fluid flow at the edge of the valve seat is substantially parallel to the lower face of the valve member 13 and tends to carry past the valve seat any particles of solid matter on the lower surface of the valve member.

We claim as our invention:—

1. A valve for controlling fluid flow, comprising a member having an annular valve seat, a valve member movable to and away from engagement with said valve seat to close and open the valve respectively, a member axially slidable in said valve seat member, said slidable member having a plane end face directed toward said valve member and substantially parallel to the seat-engaging face thereof, said slidable member also having a fluid passage extending axially through it, and yielding means for forcing said slidable member toward said valve member and means for limiting its movement toward said valve member.

2. A valve for controlling fluid flow, comprising a member having an annular valve seat, a valve member movable to and away from engagement with said valve seat to close and open the valve respectively, said valve seat member having a shoulder, a member axially slidable in said valve seat member, a flange on said slidable member, said slidable member having a fluid passage extending axially through it and plane end face directed toward said valve member and substantially parallel to the seat-engaging face thereof, and a coil compression spring acting between said shoulder and said flange and tending to force said slidable member toward said valve member and means for limiting its movement toward said valve member.

3. A valve for controlling fluid flow, comprising a member having an annular valve seat, a valve member movable to and away from engagement with said valve seat to close and open the valve respectively, said valve seat member having a shoulder, a member axially slidable in said valve seat member, a flange on said slidable member, said slidable member having a fluid passage extending axially through it, and a coil compression spring acting between said shoulder and said flange and tending to force said slidable member toward said valve member and means for limiting its movement toward said valve member.

In witness whereof, I have hereunto set my hand at Anderson, Indiana, this 18 day of May, A. D. one thousand nine hundred and twenty-nine.

FORREST M. PICKERING.

In witness whereof, I have hereunto set my hand at Aurora, Illinois, this 17 day of May, A. D. one thousand nine hundred and twenty-nine.

ALBERT G. FORD.